US010027377B2

(12) United States Patent
Hosotani

(10) Patent No.: US 10,027,377 B2
(45) Date of Patent: Jul. 17, 2018

(54) WIRELESS POWER SUPPLY APPARATUS

(71) Applicant: MURATA MANUFACTURING CO., LTD., Kyoto-fu (JP)

(72) Inventor: Tatsuya Hosotani, Kyoto-fu (JP)

(73) Assignee: Murata Manufacturing Co., Ltd., Kyoto-Fu (JP)

(*) Notice: Subject to any disclaimer, the term of this patent is extended or adjusted under 35 U.S.C. 154(b) by 343 days.

(21) Appl. No.: 14/811,252

(22) Filed: Jul. 28, 2015

(65) Prior Publication Data
US 2015/0333801 A1    Nov. 19, 2015

Related U.S. Application Data

(63) Continuation of application No. PCT/JP2014/053399, filed on Feb. 14, 2014.

(30) Foreign Application Priority Data

Feb. 15, 2013  (JP) ................. 2013-028435

(51) Int. Cl.
  *H01F 27/42*  (2006.01)
  *H01F 37/00*  (2006.01)
  (Continued)

(52) U.S. Cl.
  CPC ........... *H04B 5/0037* (2013.01); *H01F 38/14* (2013.01); *H02J 5/005* (2013.01); *H02J 7/025* (2013.01);
  (Continued)

(58) Field of Classification Search
  CPC ......... H04B 5/0037; H04B 1/16; H02J 7/025; H02J 5/005; H02J 50/12
  See application file for complete search history.

(56) References Cited

U.S. PATENT DOCUMENTS

| | | | |
|---|---|---|---|
| 7,525,293 B1* | 4/2009 | Notohamiprodjo | H02M 1/425 315/219 |
| 2007/0008744 A1* | 1/2007 | Heo | H02M 3/33523 363/17 |

(Continued)

FOREIGN PATENT DOCUMENTS

| | | |
|---|---|---|
| JP | 2008-206327 A | 9/2008 |
| JP | 2009-106136 A | 5/2009 |

(Continued)

OTHER PUBLICATIONS

Dramatic Improvement in Efficiency Dec. 4, 2012.*

(Continued)

*Primary Examiner* — Rexford Barnie
*Assistant Examiner* — Rasem Mourad
(74) *Attorney, Agent, or Firm* — Studebaker & Brackett PC

(57) ABSTRACT

A power transmitter coil, a power transmitter circuit, and a direct-current power source constitute a power transmitter unit. Further, a power receiver coil, a power receiver circuit, and a load constitute a power receiver unit. Further, a resonator coil and a resonator circuit constitute a resonator unit. In the power transmitter unit, electric energy of the direct-current power source is directly converted into electromagnetic energy, a resonant field is expanded by making resonance currents of the same frequency to flow in the power transmitter coil and the resonator coil, and in the power receiver unit, electromagnetic energy of the resonant field is directly converted into electric energy, thereby transmitting electric power from the power transmitter unit to the power receiver unit.

26 Claims, 14 Drawing Sheets

(51) Int. Cl.
*H01F 38/00* (2006.01)
*H04B 5/00* (2006.01)
*H04B 1/16* (2006.01)
*H04B 1/04* (2006.01)
*H02J 5/00* (2016.01)
*H01F 38/14* (2006.01)
*H02J 7/02* (2016.01)
*H02J 50/40* (2016.01)
*H02J 50/12* (2016.01)
*H02J 50/50* (2016.01)

(52) U.S. Cl.
CPC ............ *H02J 50/12* (2016.02); *H02J 50/40* (2016.02); *H02J 50/50* (2016.02); *H04B 1/04* (2013.01); *H04B 1/16* (2013.01); *H04B 5/0012* (2013.01); *H04B 5/0081* (2013.01)

(56) References Cited

U.S. PATENT DOCUMENTS

| | | | | |
|---|---|---|---|---|
| 2007/0252441 A1* | 11/2007 | Yamauchi | ............... | H02J 5/005 307/104 |
| 2009/0121675 A1* | 5/2009 | Ho | ............... | H02J 7/025 320/108 |
| 2010/0164297 A1* | 7/2010 | Kurs | ............... | H01Q 1/248 307/104 |
| 2010/0225271 A1 | 9/2010 | Oyobe et al. | | |
| 2011/0053500 A1* | 3/2011 | Menegoli | ............... | H02J 5/005 455/41.1 |
| 2011/0133569 A1* | 6/2011 | Cheon | ............... | H02J 17/00 307/104 |
| 2011/0316349 A1* | 12/2011 | Hashiguchi | ............... | H02J 5/005 307/104 |
| 2012/0306281 A1* | 12/2012 | Bohori | ............... | H04B 5/0037 307/104 |
| 2013/0300210 A1* | 11/2013 | Hosotani | ............... | H02J 5/005 307/104 |
| 2014/0054971 A1* | 2/2014 | Kissin | ............... | H04B 5/0075 307/104 |

FOREIGN PATENT DOCUMENTS

| | | | |
|---|---|---|---|
| JP | 2010-141966 A | | 6/2010 |
| JP | 2010141966 A | * | 6/2010 |
| JP | 2010-219838 A | | 9/2010 |
| JP | 2012-503959 A | | 2/2012 |
| JP | WO 2012101907 A1 | * | 8/2012 ............ H02J 5/005 |
| JP | 2013-504298 A | | 2/2013 |
| WO | 2012/101907 A1 | | 8/2012 |

OTHER PUBLICATIONS

"Dramatic Improvement in Efficiency; Murata Manufacturing develops new wireless power supply technology"; Electronic version of Nihon Keizai Shimbun (NIKKEI); Dec. 4, 2012; Japan; with English language translation. <URL:http://www.nikkei.com/article/DGXNASFK04022_U2A201C1000000/>.

Written Opinion of the International Searching Authority, PCT/JP2014/053399, dated Mar. 25, 2014.

International Search Report, PCT/JP2014/053399, dated Mar. 25, 2014.

* cited by examiner

[A/m]

[V/m]

WIRELESS POWER SUPPLY APPARATUS

CROSS REFERENCE TO RELATED APPLICATIONS

This application claims benefit of priority to Japanese Patent Application No. 2013-028435 filed Feb. 15, 2013, and to International Patent Application PCT/JP2014/053399 filed Feb. 14, 2014, the entire content of each of which is incorporated herein by reference.

TECHNICAL FIELD

The present technical field relates to a wireless power supply apparatus including a power transmitter unit, a power receiver unit, and a resonator unit.

BACKGROUND

Recently, with reductions in size, weight, and power consumption in electronic devices and increases in battery capacities, the number of battery-driven electronic devices is increasing. Further, close-range data communication between devices is also prevailing as a form of utilization. The same goes for electric power in connection with these situations, and close-range power supply technology is drawing attention.

For example, as described in Japanese Unexamined Patent Application Publication No. 2008-206327, a conventional contactless charging system is composed of a power transmitter unit in which a primary side coil is included in a charging table or the like and a mobile electronic device including a secondary coil and a rechargeable battery, and a user places the mobile electronic device on the power transmitter unit. This forms electromagnetic induction coupling (magnetic field coupling) between the primary side coil of the power transmitter unit and the secondary side coil of the mobile electronic device, and electric power is supplied to a charging device side, thereby charging a secondary battery.

SUMMARY

Technical Problem

In the contactless charging system of Japanese Unexamined Patent Application Publication No. 2008-206327, a power transmitter coil and a power receiver coil work as an isolation transformer that uses electromagnetic induction, and are only being used as a transformer that uses magnetic coupling. In the transformer using electromagnetic induction, it is important to allow a magnetic flux created by a current flowing in a primary winding interlinking with a secondary winding so as to create a current in the secondary winding, thereby effectively converting electricity to magnetism and magnetism to electricity.

In a wireless power supply apparatus using electromagnetic induction, an important issue is how to improve degree of magnetic coupling between a primary winding and a secondary winding in order to improve power conversion efficiency. However, in many cases, it is difficult to increase the degree of magnetic coupling in the transformer due to prevention of magnetic saturation or physical constraints, and as a result, high electric power conversion efficiency may not be obtained.

Further, in recent years, researches and developments of wireless power supply technology using resonant methods are becoming active. In 2007, Massachusetts Institute of Technology (MIT) reported electric power transfer experiments and attracted much attention. In the electric power transfer experiment with a transfer distance of 2 m and a frequency of 10 MHz, a power efficiency of about 15%, which is extremely low, was achieved. It is inferred that a major reason of the above result is the use of Colpitts oscillation circuit for generating a high frequency alternating-current. It is believed that a large portion of electric power is lost in an electric power amplifier circuit in the Colpitts oscillation circuit at a stage of generating the alternating-current. It is not too much to say that a most important issue in the wireless power supply is the generation of high frequency alternating-current with high efficiency.

The present disclosure relates to an apparatus that forms electromagnetic resonant coupling and performs wireless power supply. In cases where the wireless power supply is performed via the electromagnetic resonant coupling, there are the following issues.

(1) In conventional magnetic field resonant technology, a high frequency alternating-current source is adopted as an electric power source for generating a magnetic flux, and a linear amplifier of a class-A amplifier circuit or the like is being used. However, a power amplifier circuit has a large power loss. For example, in class-A amplifier circuit, a maximum theoretical power efficiency for generating alternating-current power is 50%. In other words, a wireless power supply system with very low power efficiency would be configured if a power amplifier circuit is used.

(2) In conventional magnetic field resonant technology, of the magnetic flux generated by the power transmitter coil, a magnetic flux interlinking with the power receiver coil is treated as a magnetic flux path, and a spatial relationship between the power transmitter coil and the power receiver coil is considered to be limited from the standpoint of that transmission efficiency is easier to improve when a magnetic flux density in the magnetic flux path is higher. Thus, the power transmitter coil and the power receiver coil are basically arranged face to face, and are subject to the restriction in their arrangement positions.

(3) In conventional magnetic field resonant technology, of the magnetic flux generated by the power transmitter coil, a magnetic flux interlinking with the power receiver coil is treated as a magnetic flux path, and, from the standpoint of that the transmission efficiency is easier to improve when the magnetic flux density in the magnetic flux path is higher, where the power transmitter coil and the power receiver coil are formed into the same shape. Thus, the power transmitter coil and the power receiver coil are subject to the restriction in shape.

An object of the present disclosure is to provide a wireless power supply apparatus that has a higher power transmission efficiency and higher flexibility in the arrangement locations and the shapes of respective devices.

Solution to Problem

A wireless power supply apparatus of the present disclosure is configured as follows.

(1) The wireless power supply apparatus includes
a power transmitter unit including a direct-current power source that supplies electric energy and a power transmitter coil electrically connected to the direct-current power source;

a power receiver unit including a load that consumes electric energy and a power receiver coil electrically connected to the load;

a power transmitter resonance circuit composed of an inductive impedance of the power transmitter coil and a parasitic capacitance of the power transmitter coil or a capacitive impedance of a resonance capacitor formed of an external capacitor;

a power transmitter switching circuit including a switch element and a switching control circuit, the switch element being electrically connected to the power transmitter resonance circuit and intermittently applying the direct-current power source to the power transmitter resonance circuit based on an on-and-off switching operation, the switching control circuit controlling the switch element and allowing the power transmitter resonance circuit to create a resonance current therein;

a power receiver resonance circuit composed of an inductive impedance of the power receiver coil and a parasitic capacitance of the power receiver coil or a capacitive impedance of a resonance capacitor formed of an external capacitor; and a power receiver load circuit that is electrically connected to the power receiver resonance circuit and supplies electric energy due to the resonance current to the load, wherein the power transmitter unit and the power receiver unit are arranged to separate spaces, the power transmitter coil extracts electric energy from the direct-current power source based on an operation of the power transmitter switching circuit and allows to create the resonance current; directly creates an electromagnetic field that periodically varies at a switching frequency fs due to the resonance current; and forms an electromagnetic resonant field where a space itself vibrates with energy, and the power receiver coil allows to create a resonance current by obtaining electric energy from the resonant field and further forms a new electromagnetic resonant field based on the resonance current.

According to the foregoing configuration, in the power transmitter unit, electric energy of the direct-current power source is directly converted into electromagnetic energy; and, in the power receiver unit, electromagnetic energy of the resonant field is directly converted into electric energy. Such a mechanism allows transmitting electric power from the power transmitter unit to the power receiver unit. In this way, energy loss may be reduced by performing a direct conversion between the electric energy and the electromagnetic energy. Further, a simple wireless power supply apparatus may be configured.

(2) Preferably, the resonant field is formed, from the power transmitter coil or the power receiver coil, in a range of one-fifth or less of a product of the speed of light (about 300 thousand (km/s)) and a switching period Is (second) that is the reciprocal of the switching frequency fs. According to this configuration, the resonant field is formed within the range of one-fifth wavelength from each coil.

(3) Preferably, the foregoing wireless power supply apparatus further includes a resonator unit including at least one resonator coil disposed in a near-field space where the power transmitter coil and the power receiver coil are present; and a resonator resonance circuit composed of an inductive impedance of the resonator coil and a parasitic capacitance of the resonator coil or a capacitive impedance of a resonance capacitor formed of an external capacitor, wherein the resonator coil allows to create a resonance current by obtaining electric energy from the resonant field and further forms a new electromagnetic resonant field based on the resonance current.

According to the foregoing configuration, the resonator unit is allowed to form the resonant field and expand the resonant field, thereby transmitting electric power efficiently from the power transmitter unit to the power receiver unit across a wide range.

(4) The resonant field is formed, from the resonator coil, in a range of one-fifth or less of a product of the speed of light (about 300 thousand (km/s)) and a switching period Ts (second) that is the reciprocal of the switching frequency fs.

(5) Preferably, the power receiver load circuit includes a rectifier circuit and is configured to supply direct-current electric energy to the load. This enables to supply the direct-current electric energy to the load, thereby making it possible to supply electric power to a plurality of loads by connecting loads in parallel.

(6) Preferably, in the switching control circuit, the switching frequency fs and a resonance frequency fr satisfy a relationship of fs=fr±30%, the resonance frequency fr being a frequency at which an imaginary part X becomes 0, the imaginary part X being an imaginary part of an equivalent input impedance when a whole load side is viewed from an input of the power transmitter resonance circuit, to which the power transmitter switching circuit is connected. This enables to execute the switching at the resonance frequency at which the imaginary part X becomes approximately 0, the imaginary part X being the imaginary part of the equivalent input impedance when the whole load side is viewed from the input of the power transmitter resonance circuit, thereby making it possible to form a high energy resonant field.

(7) Preferably, resonance frequencies that are independently set at the power transmitter resonance circuit and the resonator resonance circuit coincide with each other within a range of ±30%. This facilitates setting up of the switching frequency for forming the resonant field.

(8) Preferably, resonance frequencies that are independently set at the resonator resonance circuit and the power receiver resonance circuit coincide with each other within a range of ±30%. This facilitates expanding of the resonant field.

(9) Preferably, a radius r1 of the power transmitter coil, a radius r2 of the resonator coil, and a radius r3 of the power receiver coil satisfy a relationship of r1=r2=r3. This enables to transmit electric power efficiently while achieving down-sizing of the outer shape of coil by making the radius of the power transmitter coil, the radius of the resonator coil, and the radius of the power receiver coil substantially identical. By making these radiuses substantially identical, the maximum transmission efficiency may be obtained for a given permissible coil radius size.

(10) Preferably, the radius r1 of the power transmitter coil, the radius r2 of the resonator coil, and the radius r3 of the power receiver coil satisfy a relationship of r1>r2>r3. This enables to achieve down-sizing of the power receiver unit while maintaining power transmission efficiency.

(11) Preferably, the radius r1 of the power transmitter coil, the radius r2 of the resonator coil, and the radius r3 of the power receiver coil satisfy a relationship of r1<r2<r3. This enables to achieve down-sizing of the power transmitter unit while maintaining power transmission efficiency.

(12) Preferably, the switch element is a FET, and the power transmitter switching circuit includes a parasitic capacitance of the FET and an antiparallel diode. This enables to configure the switching circuit using the parasitic capacitance of the FET and the antiparallel diode, thereby making it possible to improve efficiency and reduce the size and weight of the wireless power supply apparatus while reducing the number of components.

(13) Preferably, in the switching control circuit, the switching frequency fs is set in such a way that an imaginary part X satisfies a relationship X≥0 by making the switching frequency fs to satisfy a relationship fs≥fr, where fr is a resonance frequency at which the imaginary part X becomes 0, the imaginary part X being an imaginary part of an equivalent input impedance when a whole load side is viewed from an input of the power transmitter resonance circuit, to which the power transmitter switching circuit is connected. This enables to perform the zero voltage switching (ZVS) operation of the switching elements in response to a change in the load. Accordingly, the efficiency may be improved by reducing the switching loss, and the wireless power supply apparatus may be reduced in size and weight.

(14) Preferably, the switching control circuit is configured to perform a zero voltage switching operation by controlling the switch element in such a manner that the switch element is turned on when a voltage across both ends of the switch element decrease to near zero voltage. This enables to reduce the switching loss by turning on when the voltage across both ends of the switch element decreases to near zero voltage, thereby making it possible to improve the efficiency and reduce the size and weight of the wireless power supply apparatus.

(15) Preferably, a plurality of the resonator units is placed in the near-field space. In this way, by placing a plurality of the resonator units in the near-field space where the power transmitter coil and the power receiver coil are present, the resonant field may be effectively expanded, and the flexibility in determining locations of the power transmitter unit and the power receiver unit may improve.

(16) Preferably, resonance frequencies that are independently set at respective ones of a plurality of the resonator resonance circuits coincide with each other within a range of ±30%. This facilitates expanding of the resonant field.

(17) Preferably, the resonator coil is disposed at such a location that a center of the resonator coil does not overlap a line segment connecting a center of the power transmitter coil and a center of the power receiver coil. This enables transmission of electric power without making the power transmitter coil and the power receiver coil face each other, thereby making it possible to improve the flexibility in arranging positions of the power transmitter unit and the power receiver unit.

(18) Preferably, a plurality of the power transmitter units is disposed, and switching frequencies set at respective ones of the plurality of the power transmitter units are identical within a range of ±30%. In this way, the resonant field may be expanded by placing a plurality of the power transmitter units, and electromagnetic energy of the resonant field may be increased by making the switching frequencies of the plurality of the power transmitter units substantially identical.

(19) Preferably, a plurality of the power receiver units is provided, and resonance frequencies of the power receiver resonance circuits included in respective ones of the plurality of the power receiver units are identical within a range of ±30%. In this way, a larger electric energy may be harvested by making the resonance frequencies of the resonance circuits included in the plurality of the power receiver units substantially identical.

(20) Preferably, it is configured such that a plurality of the power receiver coils is provided, and electric energy received at respective ones of the plurality of the power receiver coils are collected and supplied to the load. This facilitates an increase in electric energy that can be supplied to the load.

(21) Preferably, a plurality of the power transmitter units is provided, and the switching frequency set at each one of the plurality of the power transmitter units is at an industry-science-medical (ISM) band. This enables to suppress interference with peripheral devices due to electromagnetic noise and achieve electromagnetic compatibility (EMC).

(22) Preferably, the power transmitter unit includes a filter that removes a frequency component at a frequency other than the switching frequency. This enables to suppress interference with peripheral devices due to electromagnetic noise and achieve electromagnetic compatibility.

(23) Preferably, the power transmitter unit and the power receiver unit include communication circuits for communicating via radio waves. This enables the power transmitter unit to transmit an appropriate amount of electric power to an appropriate target power receiver unit at an appropriate timing. Alternatively, this enables the power receiver unit to communicate with an appropriate target power transmitter unit at an appropriate timing. This facilitates receiving of an appropriate amount of electric power.

(24) Preferably, the communication circuit is connected to the power transmitter coil, and the power transmitter coil doubles as a coil for communication. This enables the coil included in the power transmitter unit to perform double functions of electric power transmission and of a communication antenna, thereby achieving the reduction in size and weight of the device.

(25) Preferably, the communication circuit is connected to the power receiver coil, and the power receiver coil doubles as a coil for communication. This enables the coil included in the power receiver unit to perform double functions of electric power reception and communication antenna, thereby achieving the reduction in size and weight of the device.

(26) Preferably, the resonator unit includes a communication circuit connected to the resonator coil, and the resonator coil doubles as a coil for communication. This enables the coil included in the resonator unit to perform double functions of expanding the resonant field and of a communication antenna, thereby achieving the reduction in size and weight of the device.

Advantageous Effects of Invention

According to the present disclosure, the power transmitter unit directly converts electric energy of the direct-current power source into electromagnetic energy, and the power receiver unit directly converts electromagnetic energy of the resonant field into electric energy, thereby transmitting electric power from the power transmitter unit to the power receiver unit. In this way, by performing the direct conversion between electric energy and electromagnetic energy, energy loss is reduced. Further, a simple wireless power supply apparatus is configured.

DETAILED DESCRIPTION

Figure 1:
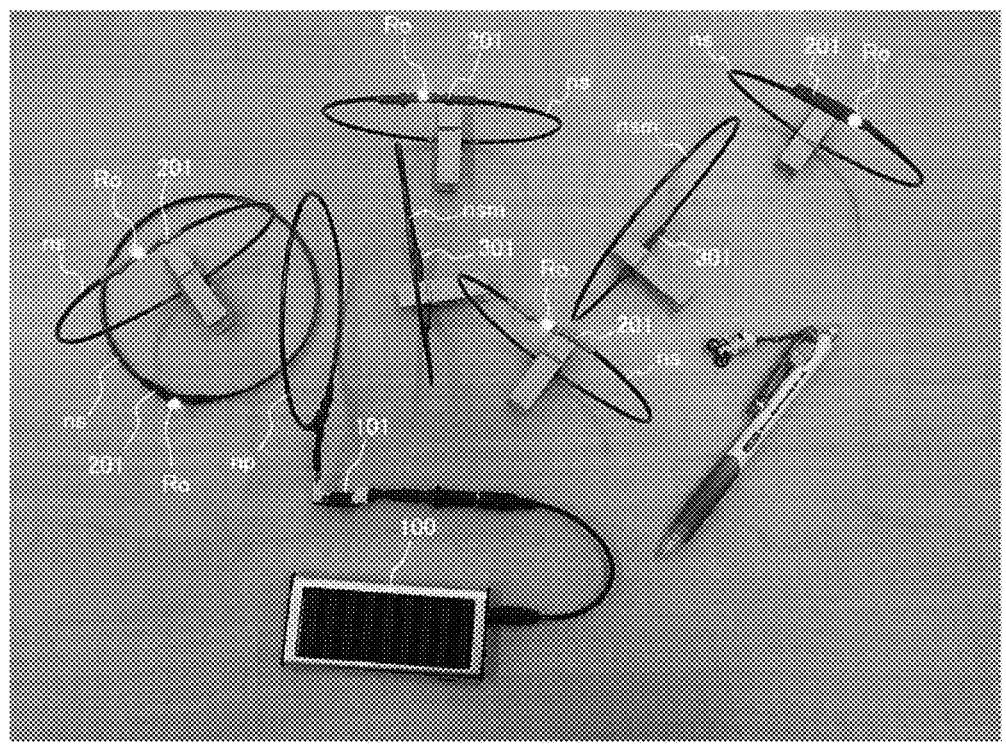
FIG. 1 is a view (photograph) depicting a scene of a demonstration experiment of a wireless power supply apparatus according to a first embodiment.

Before describing specific embodiments of the present disclosure, advantages of wireless power supply apparatuses according to the present disclosure are described.

Compared to systems based on conventional magnetic field resonant methods, the wireless power supply apparatus according to the present disclosure (hereinafter, referred to as the wireless power supply apparatus based on a "direct-current resonant method") is characterized by having a simpler system configuration and a higher overall power efficiency of the system including a power source. Further, the wireless power supply apparatus based on the direct-current resonance is also characterized that power transmission efficiency does not drastically decrease even in cases where a transmission distance changes or a load changes drastically, for example, due to an increase in the number of power transmission partners to more than one.

Compared to various conventional wireless transmission methods, the following features may be expected from the direct-current resonant method.

First, compared to the magnetic field resonant method, the overall power efficiency of a system is increased. The system configuration becomes extremely simple. Next, compared to electromagnetic induction methods, the system based on the direct-current resonance provides higher flexibility in determining arrangement locations of power transmitting and receiving devices. Further, the power transmitting and receiving devices are lighter in weight. This is advantageous in cases where a longer transmission range is desired compared to electric field coupling methods. Further, compared to radio wave methods, transmission power is higher.

The direct-current resonant method differs from the conventional magnetic field resonant method mainly in the following points.

(1) In the direct-current resonant method, a direct-current power source and a LC resonator (resonating device) directly form a "resonant field" that is a near-field of an electromagnetic field.

(2) As a result of (1), the system configuration becomes simple, and reductions in size and weight may be achieved.

(3) As a result of (1), conversion efficiency for converting electric power of a power source into the resonant field becomes higher.

The usage of the direct-current power source of (1) provides higher usefulness since most of electric energy available to us is direct-current power sources. Even commercially available alternating-current power sources such as AC 100 V at 50 Hz or 60 Hz supplied from outlets in home are, in most cases, rectified and smoothed with AC adaptors or AC-DC converters inside home appliances and used as direct-current power sources. Needless to say, dry-cell batteries and secondary batteries are direct-current power sources.

Using such direct-current power sources makes the system's circuit configuration extremely simple. Currently, a typically-available power transmitter unit based on the magnetic field resonant method includes, starting from a commercial alternating-current power source, a power supply device for isolation, an oscillator and amplifier device for outputting a high frequency current, a matching device, and a power transmitting device. A power receiver unit includes, starting from a power receiving device, a rectifying and smoothing circuit, a DC-DC converter for performing matching with a load, and the like. In cases where the load is a secondary battery, an additional charging and discharging circuit and the like are required.

Using many power conversion devices like these is fatal in view of improving electric power utilization efficiency. For example, suppose a case where the power transmitting and receiving devices each have a transmission efficiency of 80% and also the five power transmission devices each have a power efficiency of 80%, the overall power efficiency of the power supply system is $(0.8)^6=0.262$ or about 26%. Even if each device has an efficiency of 85%, the overall power efficiency is $(0.85)^6=0.377$ or about 38%. This is very low power efficiency for the system.

Figure 23:
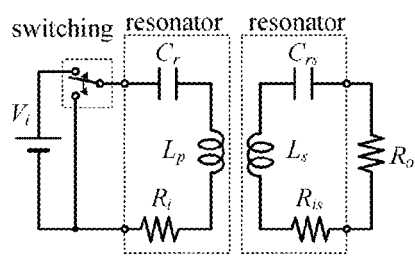
FIG. 23(A) is a base circuit diagram based on a direct-current resonant method according to the present disclosure.
FIG. 23(B) is a base circuit diagram of a conventional low power efficiency system.
Figure 23:
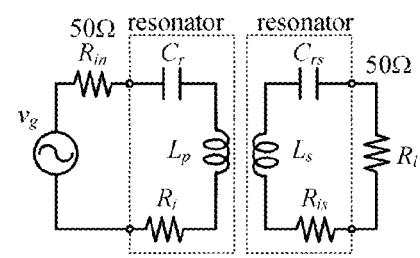

FIG. 23(A) is an equivalent base circuit diagram of a direct-current resonant method according to the present disclosure, and FIG. 23(B) is an equivalent base circuit diagram of a conventional low power-efficiency system. The direct-current resonant method according to the present disclosure takes a form in which a resonating device is directly connected to a direct-current voltage source and a switching circuit. As a result, loss associated with electric power transmission becomes very small, and the conversion efficiency for converting electric power of the power source into energy of the resonant field becomes higher compared to the conventional method. Further, having the higher conversion efficiency from the electric power of the power source to the resonant field facilitates developments of new applications of wireless power transmission using a large number of resonating devices.

The switching circuit based on the direct-current resonant method uses advanced circuit technology such as an "optimized zero voltage switching (ZVS) operation" and the like, which is useful for a class-D inverter having very small power loss such as switching loss in high speed switching operation and the like. In this circuit configuration, an output impedance becomes nearly $0\Omega$. There is almost no element that consumes energy except an equivalent internal resistance, and almost no electromagnetic energy is also consumed.

It should be noted, however, that the wireless power supply apparatus based on the direct-current resonant method is different from a wireless power supply apparatus in which a $0\Omega$ class-D inverter or class-E inverter is utilized in a simple manner. In the class-D inverter or class-E inverter, a load viewed from the power transmitting device is treated in such a way that the load is regarded as a nearly-constant $50\Omega$ pure resistance. Basically, only in a case where the load is $50\Omega$, an appropriate oscillation occurs, and electric power is allowed to be supplied to the load.

On the other hand, in the wireless power supply, the load viewed from the power transmitting device cannot be fixed. In other words, an apparent load changes depending on a coupling condition. Further, power consumption of the load also changes. Accordingly, in the direct-current resonant method according to the present disclosure, a resonant phenomenon is created using the direct-current electric power by operating at a switching frequency that makes 0 reactance in the load impedance viewed from the power transmitting device. This eliminates the need of impedance matching.

In other words, it means that this configuration enables to form an appropriate resonant field even in a case with a single load or any arbitrary number of loads such as more than one load, or even in a case where a plurality of the resonator coils is disposed. Whereas, power supply circuits of resonant type wireless power supply systems so far reported in academic conferences and the like are mostly circuits to which $50\Omega$-series communication technology is applied. However, the system that utilizes this $50\Omega$-series power source divides voltage into a power supply portion and an output load portion when viewed from the power source. As a result, the overall power efficiency is very low and reaches only 50% at a maximum. Even if it is desirable to change from $50\Omega$ to $0\Omega$, obtaining a sinusoidal wave voltage source capable of supplying electric power to a changing load at high frequency beyond MHz is a technically difficult task. In addition, in conventional art, it is necessary to design in such a manner that self-resonance frequencies of resonators of the power transmitting device and the power receiving device coincide with a frequency of high frequency alternating-current source, or so as to achieve matching. Further, at the frequency of high frequency alternating-current source, an electric power that could not achieve impedance matching is reflected and consumed as heat at $50\Omega$, which is the output impedance.

First Embodiment

Figure 2:
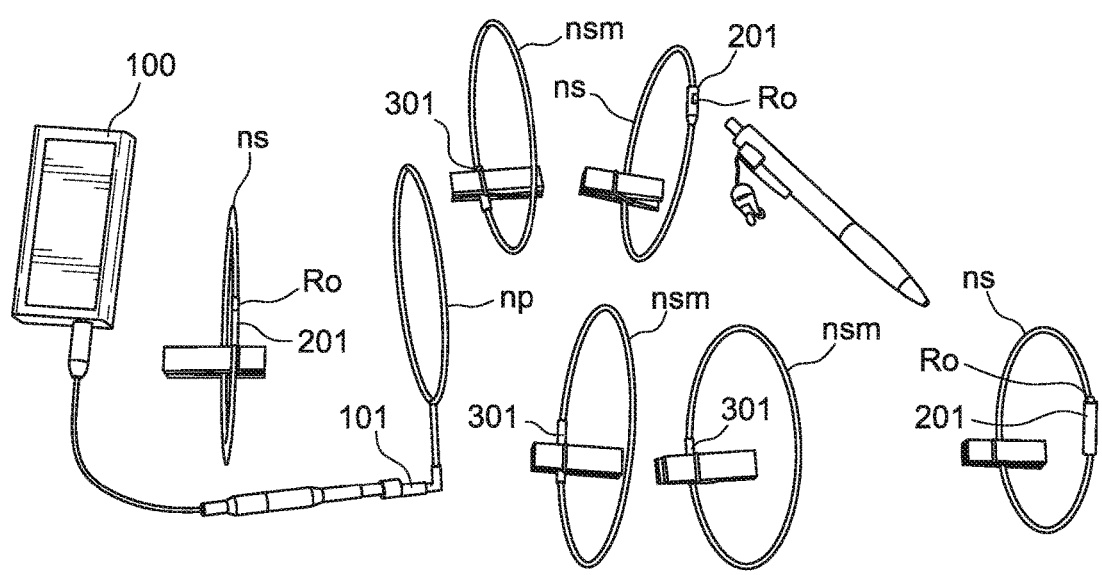
FIG. 2 is another view (photograph) depicting a scene of a demonstration experiment of the wireless power supply apparatus according to the first embodiment.

FIG. 1 and FIG. 2 are views (photograph) depicting scenes of demonstration experiments of a wireless power supply apparatus according to the first embodiment. In these figures, a power transmitter unit includes a power transmitter coil np, a power transmitter circuit 101, and a direct-current power source 100. Further, a power receiver unit includes a power receiver coil ns, a power receiver circuit 201, and a load Ro. Still further, a resonator unit includes a resonator coil nsm and a resonator circuit 301.

In this example, the power transmitter coil np, the power receiver coil ns, and the resonator coil nsm are all single-turn loop coils. The power transmitter circuit 101 forms a power transmitter resonance circuit with the power transmitter coil np, and a resonance current is created in the power transmitter resonance circuit by inputting the direct-current power source 100. This creates an electromagnetic resonant field.

The resonant field is formed, from the power transmitter coil np, the resonator coil nsm, or the power receiver coil ns, in a range of one-fifth or less of a product of the speed of light (about 300 thousand (km/s)) and a switching period Ts (second) that is the reciprocal of a switching frequency fs. In other words, the resonant field is formed within a range of one-fifth wavelength from each coil. For example, in a case where the switching frequency is 10 MHz, one wavelength is about 30 meters, and the wireless power supply may be performed in a range of one-fifth of that wavelength, which is about 6 meters, or less.

The power receiver circuit 201 forms a power receiver resonance circuit with the power receiver coil ns, and forms a power receiver load circuit that supplies direct-current power to the load Ro. Here, the load Ro is a LED. The power receiver coil ns exchanges energy within the electromagnetic resonant field so as to couple with the electromagnetic field therein and also expands the electromagnetic resonant field. The resonator circuit 301 is a resonance capacitor, and this capacitor and the resonator coil nsm constitute a resonator resonance circuit. The resonator coil nsm exchanges energy within the electromagnetic resonant field so as to couple with the electromagnetic field therein, and also expands the electromagnetic resonant field.

Figure 3:
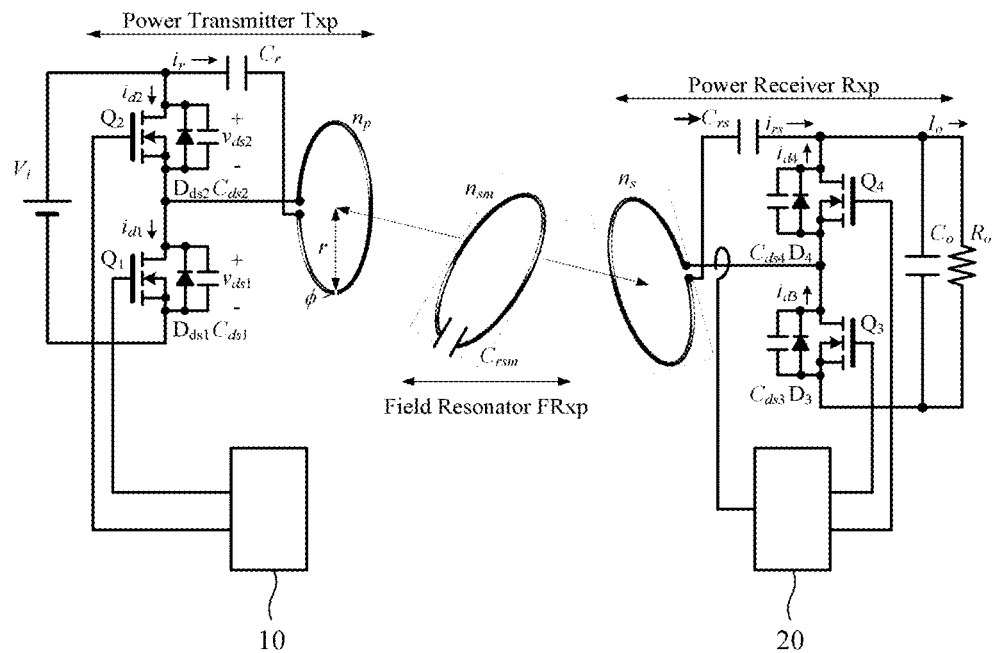
FIG. 3(A) is a circuit diagram of the wireless power supply apparatus according to the first embodiment.
FIG. 3(B) is an equivalent circuit diagram of parts thereof.
Figure 3:
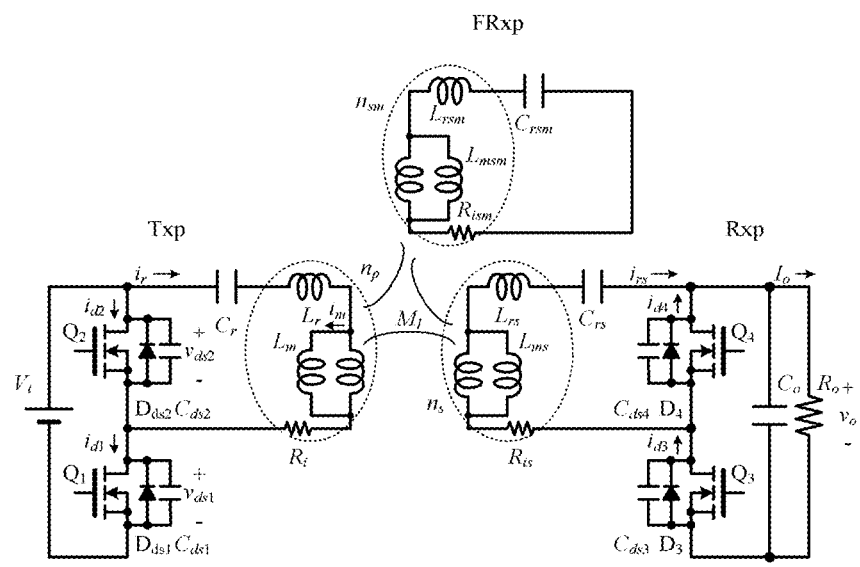

FIG. 3(A) is a circuit diagram of the wireless power supply apparatus according to the first embodiment. FIG. 3(B) is an equivalent circuit diagram of parts thereof.

The wireless power supply apparatus includes a power transmitter unit Txp including the power transmitter coil np, a resonator unit FRxp including the resonator coil nsm, and a power receiver unit Rxp including the power receiver coil ns. This wireless power supply apparatus includes an input power source Vi in an input portion of the power transmitter unit Txp, and is a system that wirelessly supplies stable direct-current energy to the load Ro of the power receiver unit Rxp.

The power transmitter unit Txp includes the power transmitter coil np, a resonance capacitor Cr, switch elements Q1 and Q2, and a "power transmitter switching circuit" including a switching control circuit 10 that controls these switch elements Q1 and Q2.

The power transmitter coil np and the resonance capacitor Cr constitute the "power transmitter resonance circuit".

A switch circuit is composed of a parallel-connected circuit of the switch element Q1, an antiparallel diode Dds1, and a parasitic capacitor Cds1. Similarly, a switch circuit is composed of a parallel-connected circuit of the switch element Q2, an antiparallel diode Dds2, and a parasitic capacitor Cds2. Hereinafter, the antiparallel diode (parasitic diode) is simply referred to as the "diode".

The switching control circuit 10 is connected to the power transmitter resonance circuit and causes the power transmitter resonance circuit to create a resonance current therein by intermittently applying a direct-current power source to the power transmitter resonance circuit by alternately turning the foregoing switch circuits on and off at a predetermined switching frequency.

In this example, the power transmitter switching circuit forms a half bridge circuit including two switch circuits.

The power receiver unit Rxp includes the power receiver coil ns, a resonance capacitor Crs, switch elements Q3 and Q4, a power receiver-side switching circuit including a switching control circuit 20 that controls the switch elements Q3 and Q4, and a smoothing capacitor Co.

The power receiver coil ns and the resonance capacitor Crs, which is equivalently connected in series to the power receiver coil ns, constitute the "power receiver resonance circuit".

A switch circuit is composed of a parallel-connected circuit of the switch element Q3, a diode Dds3, and a capacitor Cds3. Similarly, a switch circuit is composed of a parallel-connected circuit of the switch element Q4, a diode Dds4, and a capacitor Cds4.

The switching control circuit 20 detects a current flowing in the power receiver coil ns, and alternately turns the switch elements on and off in synchronization with polarity reversal of the current thus detected. Accordingly, the resonance current flowing in the power receiver resonance circuit is rectified in synchronization with the change in flow direction of the current. For example, in a case where a diode is used as the switch element, it is not particularly necessary to detect the current flowing in the power receiver coil ns. The smoothing capacitor Co smoothes a voltage rectified in a power receiver-side rectifier circuit. In this way, the direct-current power is supplied to the load Ro. These switch circuits, the switching control circuit 20, and the smoothing capacitor Co constitute the "power receiver load circuit".

The resonator unit FRxp is composed of the resonator coil nsm and a resonance capacitor Crsm.

The switching control circuit 10 on the power transmitter side operates using the input power source Vi as its power source. The switching control circuit 20 on the receiver side operates using a voltage created in the power receiver resonance circuit, an output voltage to the load, an electric power supply separately provided, or the like as its power source.

FIG. 3(B) is a circuit diagram in which the power transmitter coil np, the power receiver coil ns, and the resonator coil nsm are represented by an equivalent circuit. The power transmitter coil np and the power receiver coil ns are each represented by an equivalent circuit using an ideal transformer, a mutual inductance, and a leakage inductance. In other words, the power transmitter coil np is expressed with a mutual inductance Lm, a leakage inductance Lr, and a resistance Ri. Similarly, the power receiver coil ns is expressed with a mutual inductance Lms, a leakage inductance Lrs, and a resistance Ris. The resonator coil nsm is expressed with a mutual inductance Lmsm, a leakage inductance Lrsm, and a resistance Rism. Although it is not clearly indicated in FIG. 3(B), in some cases, it is conceivable that equivalent mutual capacitances may be created between the power transmitter coil np, the power receiver coil ns, and the resonator coil nsm.

A mutual inductance (and a mutual capacitance) equivalently formed between the power transmitter coil np and the power receiver coil ns creates electromagnetic resonant coupling, and the power receiver resonance circuit resonates with the power transmitter resonance circuit, thereby transmitting electric power from the power transmitter unit to the power receiver unit. On the other hand, reflected energy (reactive power) that has not been transmitted from the power transmitter unit is stored in the power transmitter resonance circuit as resonance energy. Further, of energy received by the power receiver unit, reflected energy (reactive power) that has not been provided to the output is also stored in the power receiver resonance circuit as resonance energy. In this way, of an incident power, a reflected power that did not become transmitted power would not be wasted as energy loss, but stored as resonance energy.

Because of the resonant phenomenon, an input current $iac_{in}(t)$ to an electromagnetic resonant coupling circuit may be expressed as follows, where Iac is the amplitude of the resonance current:

$$iac_{in}(t) = Iac\, \sin(\omega r\, t)$$

where $\omega r = 2\pi/Tr$ (Tr: resonance period). The sinusoidal wave current $iac_{in}(t)$ is supplied across direct-current power source input ports of the power transmitter unit. Although a current including various frequency components tries to enter and flow across these input ports, high-order frequency components of the current (waveform) are blocked with the electromagnetic resonant coupling circuit due to their higher impedances, and by performing a resonant operation, only a resonant current waveform of mostly a switching frequency component is allowed to flow, thereby making it possible to transmit electric power with high efficiency. Further, almost no unwanted radiation due to harmonic components is generated.

For example, in a case where 0.1 to 80 W electric power is to be wirelessly supplied over a distance of 2 to 50 mm at 7 to 13 MHz, the power transmitter coil np has, for example, a radius r=25 to 75 mm, and a wire diameter of the order of $\phi$=1 to 2 mm for a conductor wire.

The foregoing loop coil may be formed by shaping a metal wire into a loop or by forming a loop conductor pattern on a circuit board.

In a case where the radius of the power transmitter coil np is expressed as r1, the radius of the resonator coil nsm is expressed as r2, and the radius of the power receiver coil ns is expressed as r3, several types of magnitude relationships may be set between r1, r2, and r3. In a case where r1=r2=r3, electric power may be efficiently transmitted while achieving down-sizing of a coil's outer shapes. In other words, maximum transmission efficiency may be obtained for a given permissible coil radius size. Further, in a case where the relationship is r1>r2>r3, down-sizing of the power receiver unit may be achieved while maintaining power transmission efficiency. Further, in a case where the relationship is r1<r2<r3, down-sizing of the power transmitter unit may be achieved while maintaining the power transmission efficiency.

Figure 4:
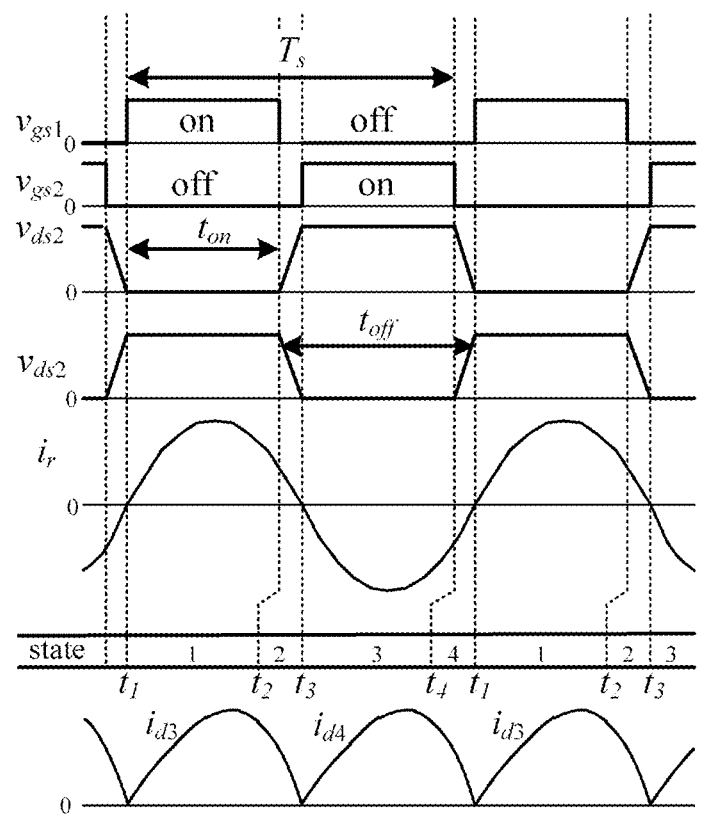
FIG. 4 is a waveform chart of respective parts of FIG. 3(A).

Next, the operation of the wireless power supply apparatus depicted in FIG. 3(A) is described in detail while referring to FIG. 4. FIG. 4 is a waveform chart of respective parts of FIG. 3(A).

Suppose the mutual inductance of the power transmitter coil np is Lm, the leakage inductance of the power transmitter coil np is Lr, the mutual inductance of the power receiver coil ns is Lms, and the leakage inductance of the power receiver coil ns is Lrs. Further, suppose voltages between gate and source of the switch elements Q1 and Q2 are vgs1 and vgs2, and voltages between drain and source are vds1 and vds2.

The switch elements Q1 and Q2 are alternately turned on and off with a short dead time in between where both the switch elements are turned off, and currents flowing in Q1 and Q2 are each commutated during a dead time period to perform the ZVS operation. During one switching period, the following actions take place in respective states.

(1) State 1 Time t1 to t2

First, the diode Dds1 conducts electricity. The ZVS operation is performed by turning the switch element Q1 on during a conduction period of the diode Dds1, thereby making the switch element Q1 to conduct electricity. The equivalent mutual inductances Lm and Lms are formed between the power transmitter coil np and the power receiver coil ns by mutual induction. In a multi-resonance circuit composed of Cr, Lr, Lm, Lms, Crs, and Lrs, the power transmitter resonance circuit and the power receiver resonance circuit resonate, making resonance currents to flow in the mutual inductances Lm and Lms. This forms the electromagnetic resonant coupling, thereby making it possible to transmit electric power from the power transmitter circuit to the power receiver circuit. On the power transmitter side, the resonance current flows in the capacitor Cr and the leakage inductance Lr. On the power receiver side, the resonance current flows in the capacitor Crs and the leakage inductance Lrs. The resonance current is rectified with the switch elements Q3 and Q4, and electric power is supplied to the load.

The state changes to State 2 when the switch element Q1 is turned off.

(2) State 2 Time t2 to t3

On the power transmitter unit Txp side, the parasitic capacitor Cds1 is charged and the parasitic capacitor Cds2 is discharged by the current it flowing in the leakage inductance Lr. When the voltage vds1 reaches voltage Vi and the voltage vds2 reaches 0 V, the diode Dds2 conducts electricity, and the state changes to State 3.

(3) State 3 Time t3 to t4

First, the diode Dds2 conducts electricity. The ZVS operation is performed by turning the switch element Q2 on during a conduction period of the diode Dds2, thereby making the switch element Q2 conduct electricity. The equivalent mutual inductances Lm and Lms are formed between the power transmitter coil np and the power receiver coil ns by mutual induction. In a multi-resonance circuit composed of Cr, Lr, Lm, Lms, Crs, and Lrs, the power transmitter resonance circuit and the power receiver resonance circuit resonate, making resonance currents to flow in the mutual inductances Lm and Lms. This forms the electromagnetic resonant coupling and transmits electric power from the power transmitter circuit to the power receiver circuit. On the power transmitter side, the resonance current flows in the capacitor Cr and the leakage inductance Lr. On the power receiver side, the resonance current flows in the capacitor Crs and the leakage inductance Lrs. The resonance current is rectified with the switch elements Q3 and Q4, and electric power is supplied to the load.

The state changes to State 4 when the switch element Q2 is turned off.

(4) State 4 Time t4 to t1

On the power transmitter unit Txp side, the parasitic capacitor Cds1 is discharged and the parasitic capacitor Cds2 is charged by the current it flowing in the leakage inductance Lr. When the voltage vds1 reaches 0 V and the voltage vds2 reaches Vi, the diode Dds1 conducts electricity, and the state returns to State 1.

Thereafter, States 1 to 4 are periodically repeated.

In the example depicted in FIG. 3(A), the switching control circuit 20 detects the current flowing in the power receiver coil ns, and the switch elements Q3 and Q4 are alternately turned on and off in synchronization with the polarity reversal thereof. Alternatively, switching timing signals of the switch elements Q1 and Q2 on the power transmitter unit side may be transmitted from the power transmitter unit Txp to the power receiver unit Rxp, and, on the power receiver unit Rxp side, the switch elements Q3 and Q4 may be driven in synchronization with the switching timing of the switch elements Q1 and Q2.

Characteristic actions of the wireless power supply apparatus depicted in FIG. 3(A) are as follows.

The resonance current is created in the power transmitter resonance circuit by intermittently applying the direct-current power source to the power transmitter resonance circuit composed of the power transmitter coil np and the resonance capacitor Cr that is directly and electrically connected to the power transmitter coil np and by turning on and off, using the switching control circuit, the switch elements that are electrically and equivalently connected to the power transmitter coil np.

The power transmitter coil extracts electric energy from the direct-current power source, creates electromagnetic resonant energy that periodically changes at a resonant frequency in space, and forms an electromagnetic resonant field.

The resonator coil creates a resonance current by obtaining electric energy from the resonant field and also forms a new electromagnetic resonant field based on this resonance current.

The power receiver coil creates a resonance current by obtaining electric energy from the resonant field, forms a new electromagnetic resonant field based on this resonance current, and supplies electric energy to the power receiver load circuit.

In the power transmitter unit, electric energy of the direct-current power source is directly converted into electromagnetic energy, the resonant field is expanded by making the resonance currents of the same frequency to flow in the power transmitter coil and the resonator coil, and in the power receiver unit, electromagnetic energy of the resonant field is directly converted into electric energy, thereby transmitting electric power from the power transmitter unit to the power receiver unit.

The transmission power is controlled with the switching control circuit that controls the switching operation.

The switching elements perform the ZVS operation.

Figure 5:
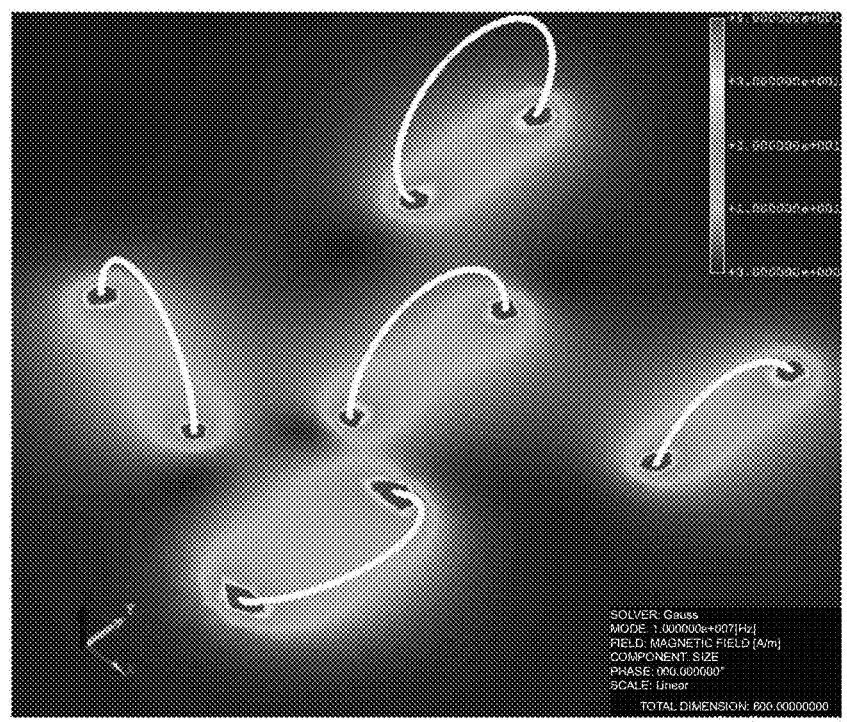
FIG. 5 is a diagram depicting intensity of magnetic field due to electromagnetic resonant fields formed by a plurality of coils (a power transmitter coil, a power receiver coil, and a resonator coil) in a state where the plurality of coils is disposed.

FIG. 5 is a diagram depicting the intensity of a magnetic field due to electromagnetic resonant fields formed by a plurality of coils (the power transmitter coil, the power receiver coil, and the resonator coil) in a state where the plurality of coils is disposed. This is a result of analysis with "Femtet" (registered trademark), finite element analysis software by Murata Software Co., Ltd. As is evident from FIG. 5, the intensity of the magnetic field is higher near the coils, and the electromagnetic resonant field is expanding in space.

Figure 6:
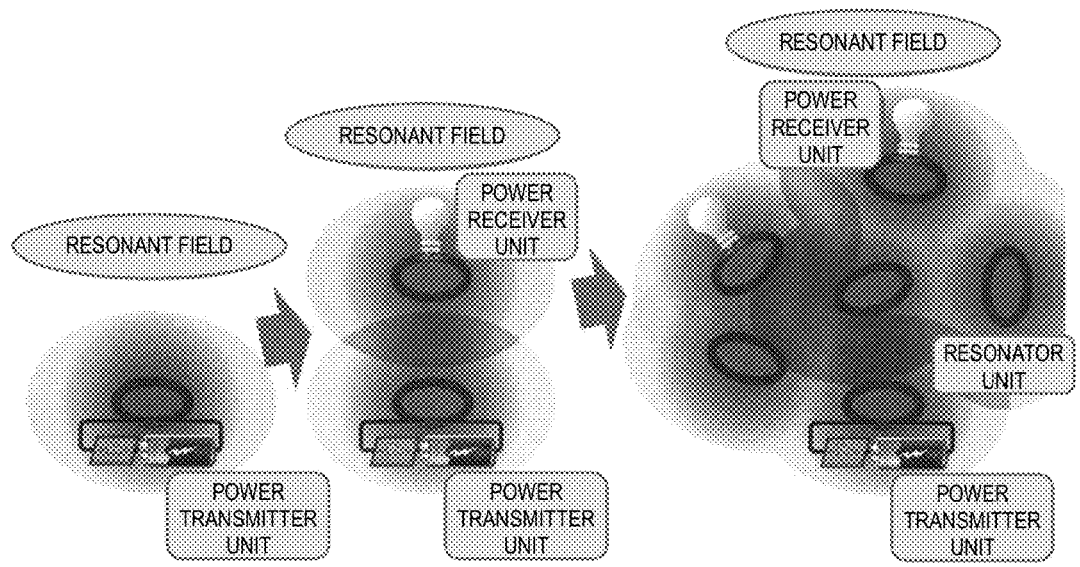
FIG. 6 is a concept diagram depicting how the electromagnetic resonant field is expanding.

FIG. 6 is a concept diagram depicting how the electromagnetic resonant field is expanding. First, the power transmitter unit forms an electromagnetic resonant field from a direct-current voltage. When the power receiver unit is placed inside this electromagnetic resonant field, the power receiver unit expands the electromagnetic resonant field. When the resonator unit is placed inside this electromagnetic resonant field, the electromagnetic resonant field is further expanded. The power transmitter unit, the power receiver unit, and the resonator unit are present in a near-field at a power transmission frequency.

The first embodiment produces the following advantageous effects.

(1) The wireless power supply system with less power loss may be configured by performing a direct conversion between electric energy and electromagnetic energy.

(2) Electromagnetic energy may be formed from the direct-current power source.

(3) Electromagnetic energy may be obtained from direct-current power by providing the rectifier circuit in a load circuit.

(4) The electromagnetic resonant field may be expanded with the resonator unit.

(5) The wireless power supply from direct-current power to direct-current power may be performed.

(6) Power transmission to a plurality of loads may be performed.

(7) Power supply to power receiver coils positioned in various three-dimensional directions may be performed.

(8) A simple wireless power supply apparatus may be configured.

(9) The transmission power may be controlled with the switching control circuit that controls the switching operation.

(10) The power loss of the switching elements may be drastically reduced by making the switching elements perform the ZVS operation.

Turning attention to a circuit topology of the wireless power supply apparatus depicted in FIG. 3(A), the power transmitter unit and the power receiver unit may be symmetrically configured. Although two EFTs disposed in the power receiver unit act as a rectifier circuit, these two FETs may also be used as oscillation elements of the switching circuit without any change. In other words, a bi-directional power transmission may be achieved. Further, this circuit block on the power receiver side may be used as a resonator unit without any change, and expanding the wireless transmission distance or branching may be achieved. Further, this circuit block may be used as any circuit of the power transmitter, the resonator, and the power receiver, and thus may be formed into a unit of circuit.

Second Embodiment

Figure 7:
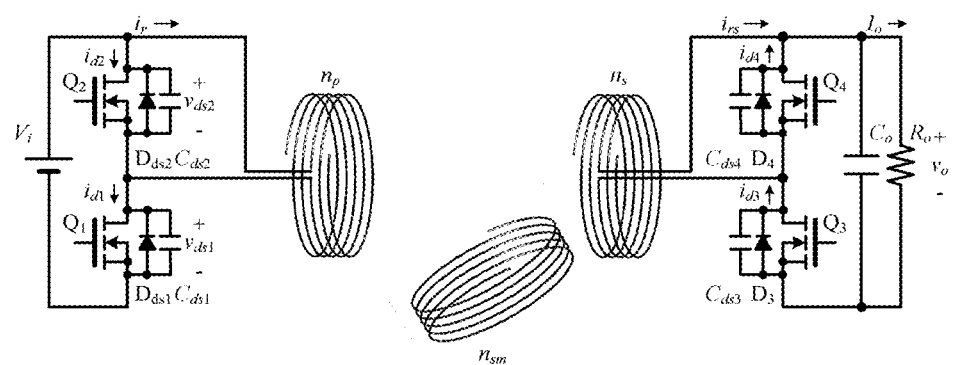
FIG. 7 is a circuit diagram of a wireless power supply apparatus according to a second embodiment.

FIG. 7 is a circuit diagram of a wireless power supply apparatus according to the second embodiment. The wireless power supply apparatus of the present embodiment differs from that of the first embodiment depicted in FIG. 3(A) in the configurations of the power transmitter coil np, the resonator coil nsm, and the power receiver coil ns. In the example depicted in FIG. 7, the power transmitter coil np, the resonator coil nsm, and the power receiver coil ns are all formed into helical antenna shapes. The power transmitter coil np forms a capacitor corresponding to the resonance capacitor Cr depicted in FIG. 3(A) with its stray capacitance. The power receiver coil ns forms a capacitor corresponding to the resonance capacitor Crs depicted in FIG. 3(A) with its stray capacitance. Similarly, the resonator coil nsm forms a capacitor corresponding to the resonance capacitor Crsm depicted in FIG. 3(A) with its stray capacitance.

Figure 8:
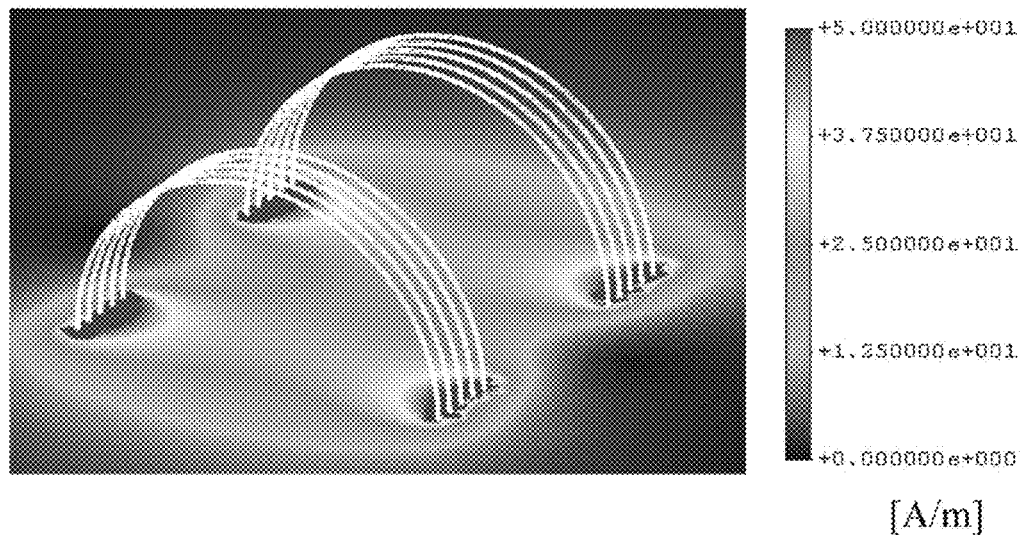
FIG. 8(A) is a diagram depicting intensity of magnetic field generated near two adjacent coils of a power transmitter coil np, a resonator coil nsm, and a power receiver coil ns of the wireless power supply apparatus according to the second embodiment.
FIG. 8(B) is a diagram depicting intensity of electric field thereof.
Figure 8:
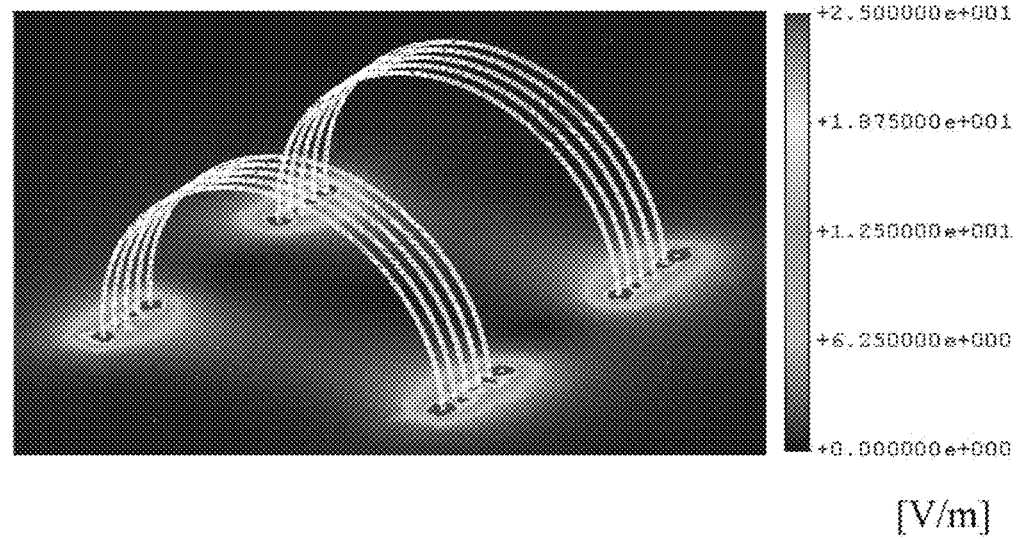

FIG. 8(A) is a diagram depicting the intensity of a magnetic field generated near two adjacent coils of the power transmitter coil np, the resonator coil nsm, and the power receiver coil ns. FIG. 8(B) is a diagram depicting the intensity of an electric field thereof. Both are results of analysis with the foregoing finite element analysis software. As is evident from FIG. 8(A) and FIG. 8(B), the intensity of the magnetic field becomes higher so as to connect the coils whereas the intensity of the electric field becomes higher near the coils.

The second embodiment produces, in addition to the actions and effects described in the first embodiment, an effect of eliminating the resonance capacitors.

Third Embodiment

Suppose a switching frequency is expressed as fs, a reactance of input impedance is expressed as X when the whole load side is viewed from the power transmitter resonance circuit connected to the power transmitter switching circuit, and a resonant frequency at which X=0 is expressed as fa, a switching control circuit of a wireless power supply apparatus according to the third embodiment is operated at the switching frequency fs that is set near the resonant frequency fa (fs=fr±30%).

Figure 9:
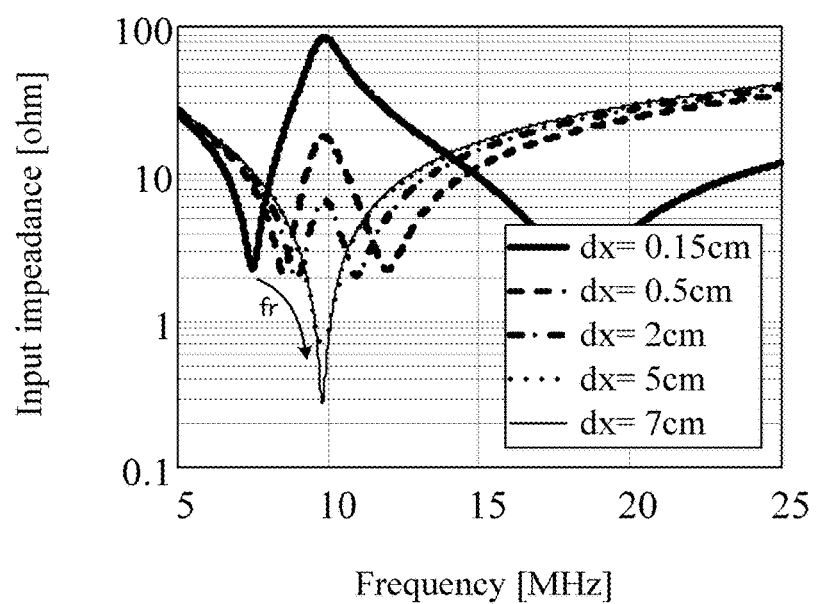
FIG. 9 is a diagram depicting frequency characteristics of input impedance of a wireless power supply apparatus according to a third embodiment in a case where a whole load side is viewed from input of a power transmitter resonance circuit.

FIG. 9 is a diagram depicting frequency characteristics of input impedance of the wireless power supply apparatus according to the third embodiment when the whole load side is viewed from the input of the power transmitter resonance circuit. Here, values of the resonance capacitors Cr and Crs are determined so as to provide a resonance frequency of near 10 MHz. Suppose the load resistance Ro=10Ω and a distance dx is changed to 0.15, 0.5, 2.0, 5.0, and 7.0 cm, the resonance frequency fr, at which the input impedance reaches a minimum, shifts as indicated in the figure by an arrow.

For example, in a case where a power transmission distance dx=7 cm (70 mm), the switching frequency fs is set to, for example, 10 MHz, for the resonance frequency fr is approximately equal to 10 MHz.

In this way, the electromagnetic resonant field may be formed by setting the switching frequency fs for operation near the resonant frequency fa. At the resonant frequency, electromagnetic resonant energy becomes larger, and the amount of transmission power of electromagnetic energy becomes larger. As a result, a larger electric power may be transmitted to a greater distance over a space. Further, in the wireless power supply apparatus, the improvement in efficiency and the reductions in size and weight may be achieved.

Fourth Embodiment

A switching control circuit of a wireless power supply apparatus according to the fourth embodiment is operated in a state where the foregoing resonance frequency fr is less than the switching frequency fs. In other words, the input impedance of a multi-resonance circuit viewed from the switching circuit is inductive.

Figure 10:
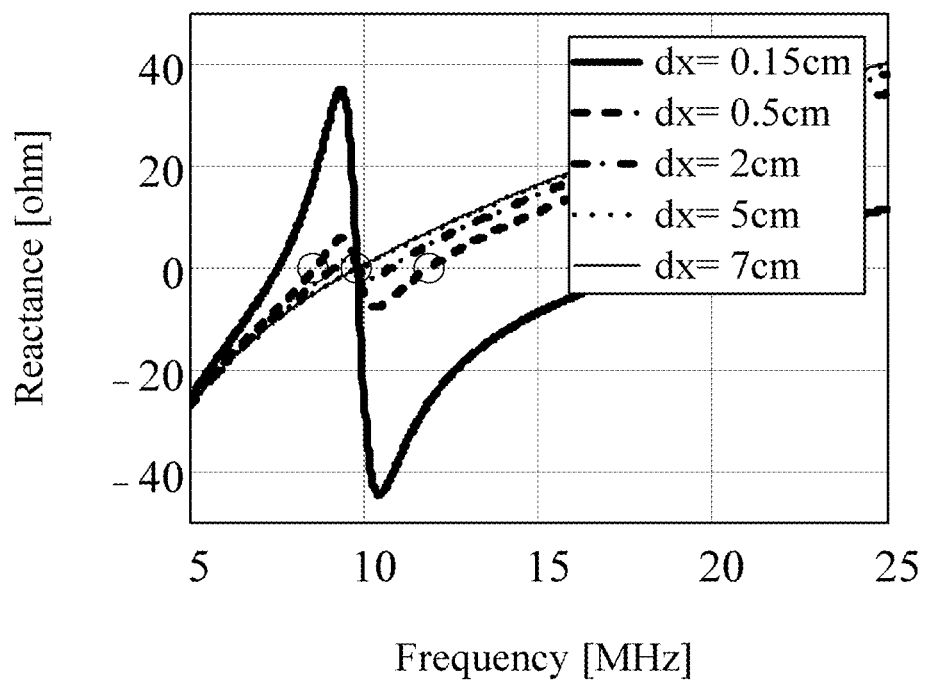
FIG. 10 is a diagram depicting frequency characteristics of reactance of input impedance of a wireless power supply apparatus according to a fourth embodiment in a case where a whole load side is viewed from input of a power transmitter resonance circuit.

FIG. 10 is a diagram depicting frequency characteristics of the reactance of input impedance of the wireless power supply apparatus according to the fourth embodiment in a case where the whole load side is viewed from the input of the power transmitter resonance circuit. Here, values of the resonance capacitors Cr and Crs are determined so as to provide a resonance frequency of near 10 MHz. In a case where the load resistance Ro=10Ω and the distance dx is changed to 0.15, 0.5, 2.0, 5.0, and 7.0 cm, the reactance shifts as indicated in FIG. 10.

As the distance dx increases, the frequency characteristic change from a diphasic characteristic in which the reactance becomes 0 at three frequencies and local maximums are achieved at two frequencies to a single-peak characteristic in which the reactance becomes 0 at one frequency. Turning attention to the reactance of input impedance, it is clear that inductive property and capacitive property are switched before and after the three frequencies. Three circles in FIG. 10 indicate the frequencies at which the inductive property and the capacitive property are switched at dx=0.5 cm. In order to achieve the ZVS operation, it is necessary to create a delay current with respect to voltage by making the input impedance inductive. This delay current enables charging and discharging of the parasitic capacitors Cds1 and Cds2 of the switch elements (FET) during the dead time. Thus, for example, in the diphasic characteristic that has larger magnetic coupling, it is necessary to have the operation switching frequency fs within a frequency range in which the foregoing input impedance becomes inductive.

Determining the switching frequency in this way allows the switching elements to perform the ZVS operation across the whole load range. Thus, the power loss of the switching elements may be greatly reduced. Further, the efficiency may be improved by reducing the switching loss, and the wireless power supply apparatus may be reduced in size and weight.

Fifth Embodiment

Figure 11:
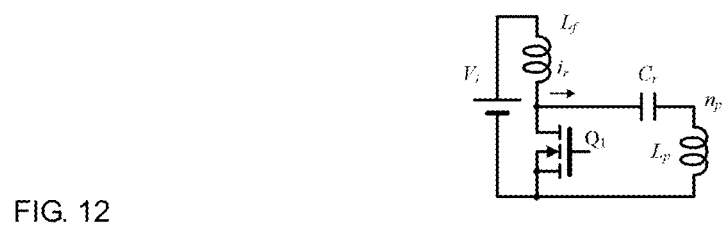
FIG. 11 is a circuit diagram of a power transmitter unit in a wireless power supply apparatus according to a fifth embodiment.

FIG. 11 is a circuit diagram of a power transmitter unit in a wireless power supply apparatus according to the fifth embodiment. In an example of FIG. 11, there is provided an inductor Lf whose inductance value is large enough to form, from an input direct-current voltage, a current source that may be considered as a direct-current power source in relative terms with respect to the alternating current flowing in the power transmitter coil np, and only one switch element Q1 is provided on the power transmitter side. The inductance value of the inductor Lf is sufficiently larger than the inductance value of the power transmitter coil np, and becomes high impedance at the switching frequency. Thus, variation of the current flowing therein is sufficiently small.

Figure 12:
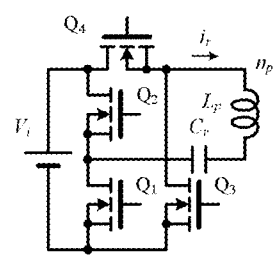
FIG. 12 is a circuit diagram of a power transmitter unit in another wireless power supply apparatus according to the fifth embodiment.
Figure 13:
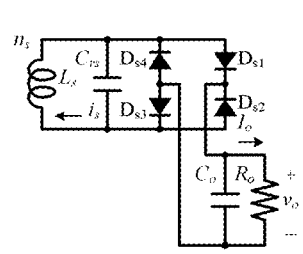
FIG. 13(A) and FIG. 13(B) are circuit diagrams of a power receiver unit in a wireless power supply apparatus according to a sixth embodiment.
Figure 13:
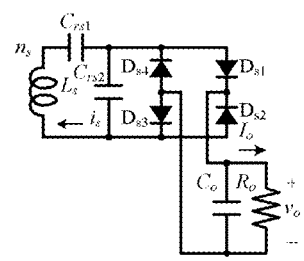
Figure 14:
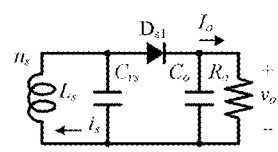
FIG. 14(A) and FIG. 14(B) are circuit diagrams of a power receiver unit in another wireless power supply apparatus according to the sixth embodiment.
Figure 14:
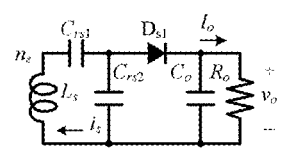
Figure 15:
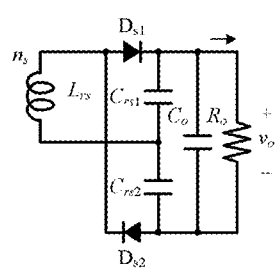
FIG. 15(A) and FIG. 15(B) are circuit diagrams of a power receiver unit in another wireless power supply apparatus according to the sixth embodiment.
Figure 15:
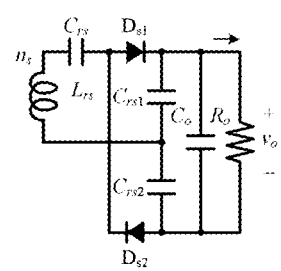
Figure 16:
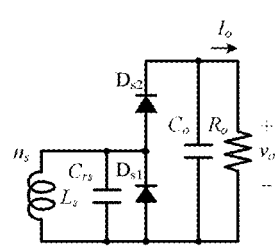
FIG. 16(A) and FIG. 16(B) are circuit diagrams of a power receiver unit in another wireless power supply apparatus according to the sixth embodiment.
Figure 16:
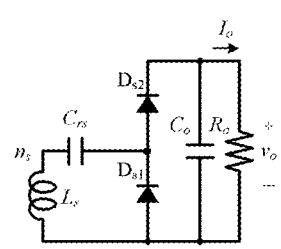
Figure 17:
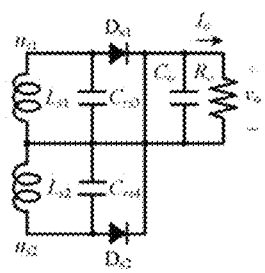
FIG. 17(A) and FIG. 17(B) are circuit diagrams of a power receiver unit in another wireless power supply apparatus according to the sixth embodiment.
Figure 17:
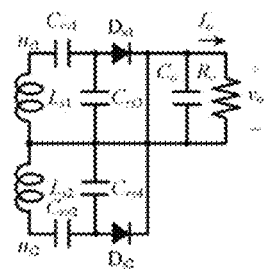

FIG. 12 is a circuit diagram of a power transmitter unit in another wireless power supply apparatus according to the fifth embodiment. In an example of FIG. 12, a bridge circuit is formed of four switch elements Q1 to Q4. The switch elements Q1 and Q4 are turned on and off together, and the switch elements Q2 and Q3 are turned on and off together. Further, the switch elements Q1 and Q2 are alternately turned on and off. In this way, the power transmitter switching circuit may be formed into a full-bridge configuration, and the resonance current may be created by alternately turning on and off two pairs of the four switch elements that are bridge-connected.

The voltage applied to each switch element may be reduced by arranging the switch elements on the power transmitter unit side into the bridge configuration, thereby making it possible to improve the efficiency and reduce the size and weight of the wireless power supply apparatus.

Sixth Embodiment

FIGS. 13 to 17 are circuit diagrams of a power receiver unit in a wireless power supply apparatus according to the sixth embodiment.

In examples of FIG. 13(A) and FIG. 13(B), a rectifier circuit on the power receiver side is configured as a diode bridge circuit composed of diodes Ds1, Ds2, Ds3, and Ds4. The example of FIG. 13(B) includes two resonance capacitors Crs1 and Crs2, and is configured to rectify divided voltages of these two resonance capacitors Crs1 and Crs2.

In examples of FIG. 14(A) and FIG. 14(B), the rectifier circuit on the power receiver side is configured as a half-wave rectifier circuit. A diode Ds1 rectifies a current flowing in a resonance capacitor Crs and supplies a rectified current to a load. The example of FIG. 14(B) includes two resonance capacitors Crs1 and Crs2, and is configured to rectify divided voltages of these two resonance capacitors Crs1 and Crs2.

In examples of FIG. 15(A) and FIG. 15(B), the rectifier circuit on the power receiver side is configured as a voltage doubler rectifier circuit. Diodes Ds1 and Ds2 rectify a current flowing in resonance capacitors Crs1 and Crs2, and supply a doubled voltage to a load. The example of FIG. 15(B) includes three resonance capacitors Crs, Crs1, and Crs2, and is configured to rectify divided voltages of these three resonance capacitors Crs, Crs1, and Crs2.

In examples of FIG. 16(A) and FIG. 16(B), the rectifier circuit on the power receiver side is configured as a voltage doubler rectifier circuit. Diodes Ds1 and Ds2 perform a double voltage rectification on a current flowing in a resonance capacitor Crs, and supply a doubled voltage to a load.

In examples of FIG. 17(A) and FIG. 17(B), a power receiver unit includes power receiver coils ns1 and ns2 that have a center tap. These two power receiver coils ns1 and ns2 are connected to their respective rectifier circuits. In this way, a center-tapped rectifier circuit is configured.

The power receiver coils ns1 and ns2 may not be necessarily provided by pulling out the center tap. Alternatively, two loop coils may be connected in series. Further, the two loop coils are not necessarily coupled together, and the power receiver coils ns1 and ns2 may alternatively be orthogonal to each other. This expands the range of azimuth angle (directivity) at which a power transmitter coil np and the power receiver coils ns1 and ns2 may be coupled. The example of FIG. 17(B) includes two resonance capacitors Crs1 and Crs3 that are connected to the power receiver coil ns1, and is configured to rectify divided voltages of these two resonance capacitors Crs1 and Crs3. Similarly, two resonance capacitors Crs2 and Crs4 are connected to the power receiver coil ns2, and the example of FIG. 17(B) is configured to rectify divided voltages of these two resonance capacitors Crs2 and Crs4.

Seventh Embodiment

Figure 18:
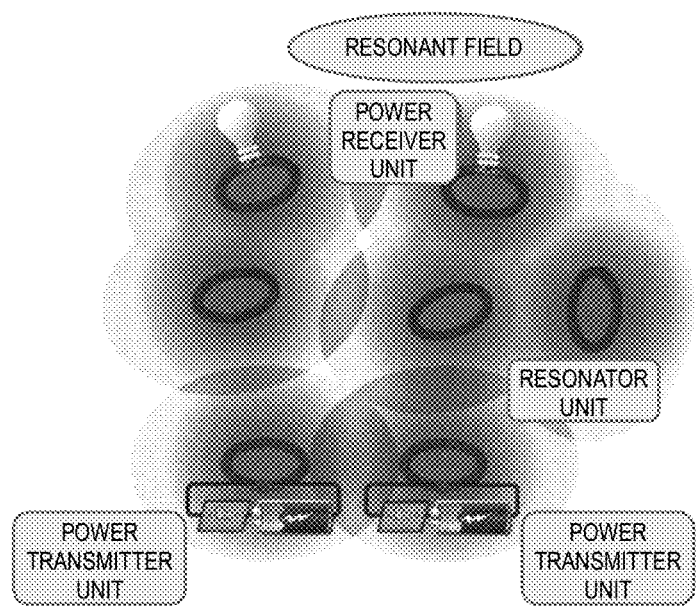
FIG. 18 is an example in which a resonant field is intensified by arranging a plurality of power transmitter units and a plurality of power receiver units.
Figure 19:
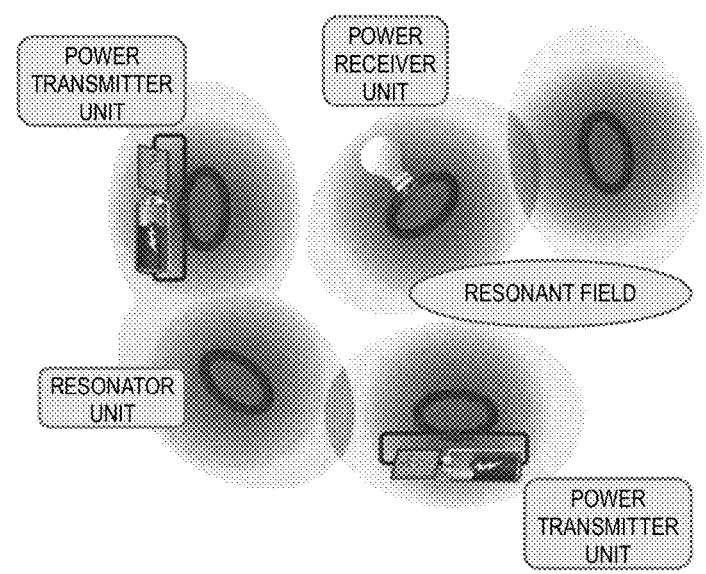
FIG. 19 is a schematic configuration diagram of a wireless power supply apparatus including a plurality of power transmitter units and a plurality of power receiver units.

FIG. 18 and FIG. 19 are schematic configuration diagrams of wireless power supply apparatuses each including a plurality of power transmitter units and a plurality of power receiver units. Particularly, FIG. 18 is an example in which the resonant field is intensified by arranging a plurality of power transmitter units and a plurality of power receiver units. FIG. 19 is an example in which the resonant field is expanded by arranging a plurality of power transmitter units and a plurality of power receiver units.

In this way, the electromagnetic resonant field may be expanded by arranging a plurality of power transmitter units and a plurality of power receiver units. Further, with a plurality of power transmitter units, the transmission power may be increased. Further, with a plurality of power receiver units, electric power may be supplied to a plurality of loads disposed across separate spaces.

Further, with a plurality of power transmitter units and a plurality of resonator units, the electromagnetic resonant field may be expanded, thereby improving flexibility in determining locations of the power receiver units where the power receiver unit can receive the power.

Eighth Embodiment

Figure 20:
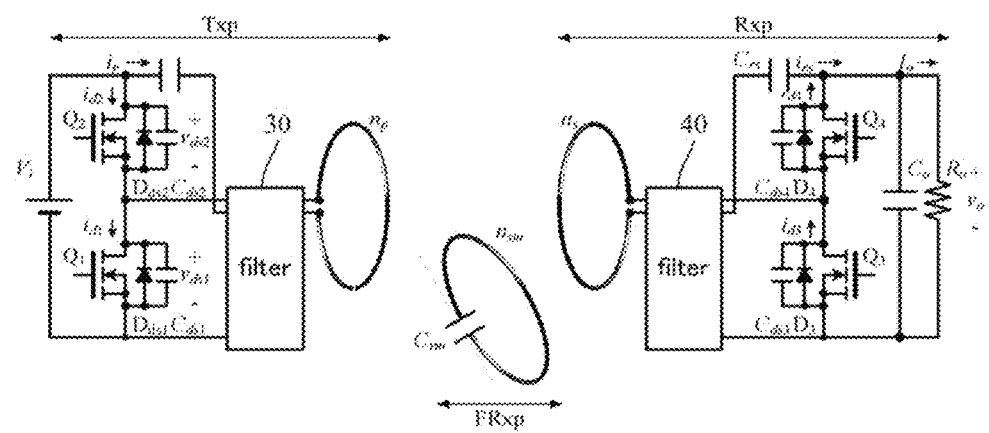
FIG. 20 is a circuit diagram of a wireless power supply apparatus according to an eighth embodiment.

FIG. 20 is a circuit diagram of a wireless power supply apparatus according to the eighth embodiment. In this example, a filter 30 is provided between a power transmitter coil np and a power transmitter circuit. Further, a filter 40 is provided between a power receiver coil ns and a power receiver circuit. The remaining structure is the same as the one depicted in FIG. 3(A).

The foregoing filters 30 and 40 are band pass filters that pass electric power at a resonant frequency and remove (reflect) electric power at frequencies other than the resonant frequency. Having such filters suppresses the occurrence of unwanted noise, and this reduces electromagnetic interference problems with peripheral devices and achieves electromagnetic compatibility (EMC).

The industry-science-medical (ISM) band may be used for the electromagnetic resonant frequency to reduce the electromagnetic interference problems with peripheral devices. For example, as the ISM bands, frequencies near 6.7 MHz, 13.56 MHz, or 27.12 MHz may be used.

Ninth Embodiment

Figure 21:
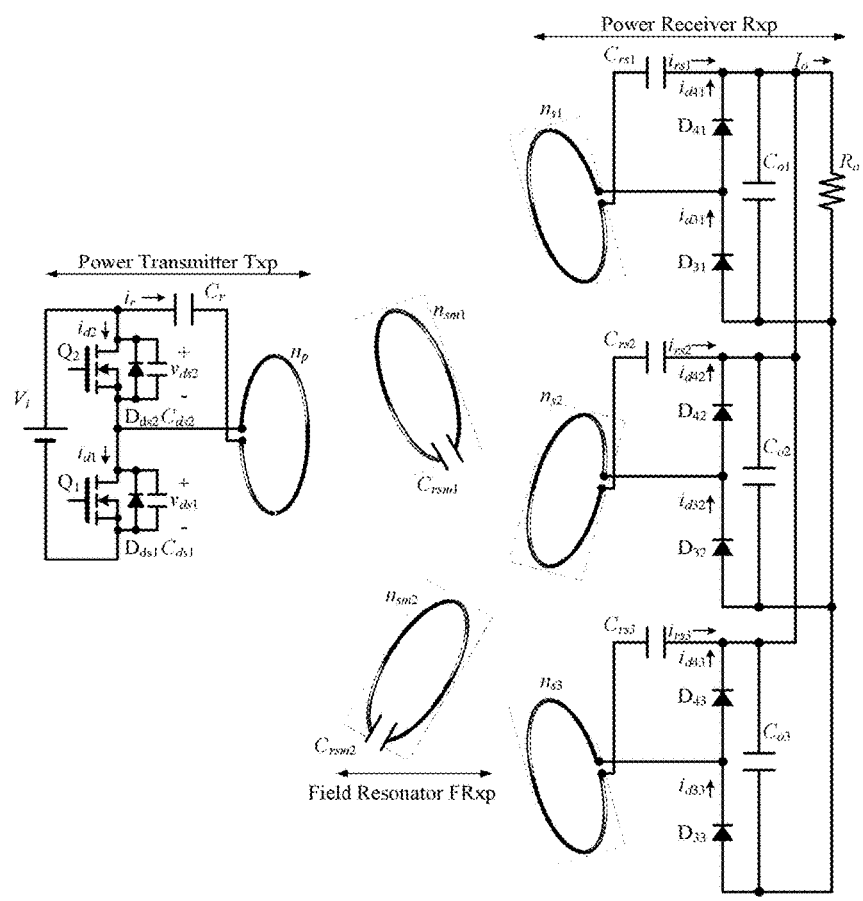
FIG. 21 is a circuit diagram of a wireless power supply apparatus according to a ninth embodiment.

FIG. 21 is a circuit diagram of a wireless power supply apparatus according to the ninth embodiment. The wireless power supply apparatus includes a power transmitter unit Txp including the power transmitter coil np, a resonator unit FRxp including the resonator coil nsm, and a power receiver unit Rxp including the power receiver coil ns.

The power receiver unit Rxp includes a group of a power receiver coil ns1 and a power receiver circuit composed of a resonance capacitor Crs1, rectifier diodes D41 and D31, and a smoothing capacitor Co1, a group of a power receiver coil ns2 and a power receiver circuit composed of a resonance capacitor Crs2, rectifier diodes D42 and D32, and a smoothing capacitor Cot, and a group of a power receiver coil ns3 and a power receiver circuit composed of a resonance capacitor Crs3, rectifier diodes D43 and D33, and a smoothing capacitor Co3. Further, the power receiver unit Rxp is configured in such a manner that outputs of these three power receiver circuits are connected in parallel and direct-current power is supplied to a single load Ro.

In this example, a resonator unit FRxp composed of a resonator coil nsm1 and a resonance capacitor Crsm1 and a resonator unit FRxp composed of a resonator coil nsm2 and a resonance capacitor Crsm2 are provided.

In this way, it may be configured in such a way that a plurality of power receiver coils are arranged in different locations and electric energy received at the respective power receiver coils are collected and supplied to the load. This facilitates an increase in electric energy that can be supplied to a load.

Tenth Embodiment

Figure 22:
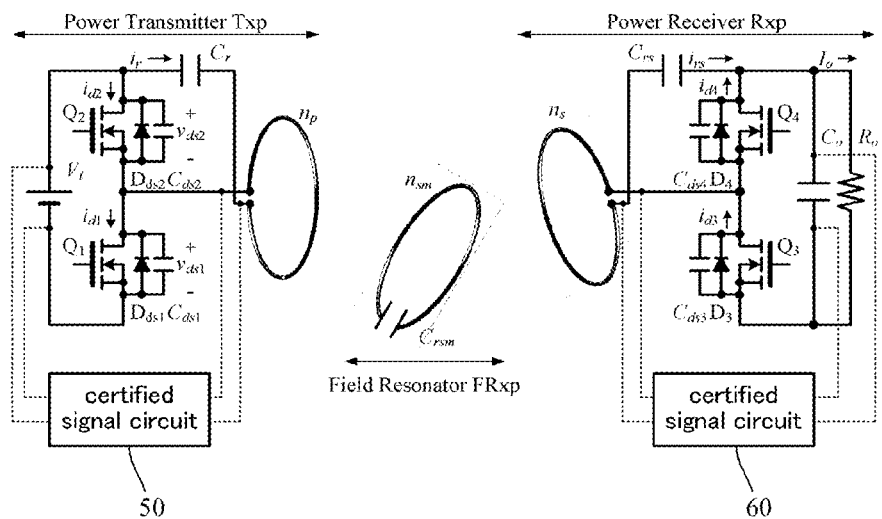
FIG. 22 is a circuit diagram of a wireless power supply apparatus according to a tenth embodiment.

FIG. 22 is a circuit diagram of a wireless power supply apparatus according to the tenth embodiment. In this wireless power supply apparatus, a power transmitter unit includes a communication circuit 50 that operates using an input power source Vi as a power source and uses a power transmitter coil np as a coil for communications (near-field antenna). Further, a power receiver unit includes a communication circuit 60 that operates using a rectified and smoothed voltage as a power source and uses a power receiver coil ns as a coil for communications (near-field antenna). In other words, the power transmitter coil np and the power receiver coil ns each have double functions of power transmission and signal communication. This enables reductions in size and weight of the power transmitter unit.

A communication signal is added by using the power transmission frequency as a carrier frequency and by modulating it. Thus, the communication signal is also communicated via the electromagnetic resonant field. This communication enables transmission of a variety of data and timing signals from the power transmitter unit to an appropriate (intended) power receiver unit. Alternatively, a variety of data and timing signals may be transmitted from the power receiver unit to an appropriate (intended) power transmitter unit. For example, various states on the power transmitter unit side and various states on the power receiver unit side may be communicated to each other. Alternatively, the power receiver unit may perform synchronous rectification in synchronization with switching of a switch element of the power transmitter unit.

Unlike the power transmission, low power transmission efficiency does not lead to an increase in loss in the signal transmission. Thus, the foregoing communication signal may use an independent frequency separated from the power transmission frequency.

In the example depicted in FIG. 22, the communication circuits 50 and 60 are provided in the power transmitter unit and the power receiver unit. Alternatively, the resonator unit FRxp may be provided with a rectifier and smoothing circuit as well as a communication circuit.

In the foregoing embodiments, the examples are described in which loop coils or helical antenna-like coils are used. Alternatively, spiral coils may be used. Coils including magnetic cores may also be used.

In the foregoing embodiments, the examples are described in which both the power transmitter coil and the power receiver coil are the loop coils or the helical antenna-like coils. Alternatively, different types of coils may be used together.

In the foregoing embodiment, the example is described in which a plurality of power receiver units is provided for receiving power from the common power transmitter unit. Alternatively, a plurality of power transmitter units may be provided for transmitting power to the common power receiver unit.

In an alternative configuration, electric energy received at a plurality of power receiver units may be collected, and the direct-current power may be supplied to a single load or a plurality of loads.

The invention claimed is:

1. A wireless power supply apparatus comprising:
    a power transmitter unit including a direct-current power source that supplies electric energy and a power transmitter coil electrically connected to the direct-current power source;
    a power receiver unit including a load that consumes electric energy and a power receiver coil electrically connected to the load;

a power transmitter resonance circuit composed of an inductive impedance of the power transmitter coil and a parasitic capacitance of the power transmitter coil or a capacitive impedance of a resonance capacitor formed of an external capacitor;

a power transmitter switching circuit including a switch element and a switching control circuit, the switch element being electrically connected to the power transmitter resonance circuit and intermittently applying the direct-current power source to the power transmitter resonance circuit based on an on-and-off switching operation, the switching control circuit controlling the switch element and allowing the power transmitter resonance circuit to create a resonance current therein;

a power receiver resonance circuit composed of an inductive impedance of the power receiver coil and a parasitic capacitance of the power receiver coil or a capacitive impedance of a resonance capacitor formed of an external capacitor; and a power receiver load circuit that is electrically connected to the power receiver resonance circuit and supplies electric energy due to the resonance current to the load, wherein the power transmitter unit and the power receiver unit are arranged in separate spaces, the power transmitter coil extracts electric energy from the direct-current power source based on an operation of the power transmitter switching circuit and creates the resonance current; directly creates an electromagnetic field that periodically varies at a switching frequency fs due to the resonance current; and forms an electromagnetic resonant field where a space vibrates with energy, the power receiver coil creates a resonance current by obtaining electric energy from the resonant field and further forms a new electromagnetic resonant field based on the resonance current, and the switching control circuit is configured to control the switch element so that the switching frequency fs is set such that an imaginary part X is 0 or substantially 0, the imaginary part X being an imaginary part of an equivalent input impedance when a whole load side is viewed from an input of the power transmitter resonance circuit, to which the power transmitter switching circuit is connected.

2. The wireless power supply apparatus according to claim 1, wherein the resonant field is formed, from the power transmitter coil or the power receiver coil, in a range of one-fifth or less of a product of speed of light (about 300 thousand (km/s)) and a switching period Ts (second) that is a reciprocal of the switching frequency fs.

3. The wireless power supply apparatus according to claim 1, further comprising:

a resonator unit including at least one resonator coil disposed in a near-field space where the power transmitter coil and the power receiver coil are present; and a resonator resonance circuit composed of an inductive impedance of the resonator coil and a parasitic capacitance of the resonator coil or a capacitive impedance of a resonance capacitor formed of an external capacitor, wherein the resonator coil creates a resonance current by obtaining electric energy from the resonant field and further forms a new electromagnetic resonant field based on the resonance current.

4. The wireless power supply apparatus according to claim 3, wherein the resonant field is formed, from the resonator coil, in a range of one-fifth or less of a product of speed of light (about 300 thousand (km/s)) and a switching period Ts (second) that is the reciprocal of the switching frequency fs.

5. The wireless power supply apparatus according to claim 1, wherein the power receiver load circuit includes a rectifier circuit and supplies direct-current electric energy to the load.

6. The wireless power supply apparatus according to claim 1, wherein the switching control circuit is configured to control the switch element so that the switching frequency fs and a resonance frequency fr satisfy a relationship of fs=fr±30%, the resonance frequency fr being a frequency at which the imaginary part X is 0.

7. The wireless power supply apparatus according to claim 3, wherein resonance frequencies that are independently set at the power transmitter resonance circuit and the resonator resonance circuit coincide with each other within a range of ±30%.

8. The wireless power supply apparatus according to claim 3, wherein resonance frequencies that are independently set at the resonator resonance circuit and the power receiver resonance circuit coincide with each other within a range of ±30%.

9. The wireless power supply apparatus according to claim 3, wherein a radius r1 of the power transmitter coil, a radius r2 of the resonator coil, and a radius r3 of the power receiver coil satisfy a relationship of r1=r2=r3.

10. The wireless power supply apparatus according to claim 3, wherein a radius r1 of the power transmitter coil, a radius r2 of the resonator coil, and a radius r3 of the power receiver coil satisfy a relationship of r1>r2>r3.

11. The wireless power supply apparatus according to claim 3, wherein a radius r1 of the power transmitter coil, a radius r2 of the resonator coil, and a radius r3 of the power receiver coil satisfy a relationship of r1<r2<r3.

12. The wireless power supply apparatus according to claim 1, wherein the switch element is a FET, and the power transmitter switching circuit includes a parasitic capacitance of the FET and an antiparallel diode.

13. The wireless power supply apparatus according to claim 1, wherein the switching control circuit is configured to control the switch element so that the switching frequency fs is set such that the imaginary part X satisfies a relationship X≥0 by making the switching frequency fs satisfy a relationship fs≥fr, where fr is a resonance frequency at which the imaginary part X is 0.

14. The wireless power supply apparatus according to claim 1, wherein the switching control circuit is configured to perform a zero voltage switching operation by controlling the switch element in such a manner that the switch element is turned on when a voltage across both ends of the switch element decreases to near zero voltage.

15. The wireless power supply apparatus according to claim 3, wherein a plurality of the resonator units is placed in the near-field space.

16. The wireless power supply apparatus according to claim 15, wherein
resonance frequencies that are independently set at respective ones of a plurality of the resonator resonance circuits coincide with each other within a range of ±30%.

17. The wireless power supply apparatus according to claim 3, wherein
the resonator coil is disposed at such a location that a center of the resonator coil does not overlap a line segment connecting a center of the power transmitter coil and a center of the power receiver coil.

18. The wireless power supply apparatus according to claim 1, wherein
a plurality of the power transmitter units is provided, and switching frequencies set at respective ones of the plurality of the power transmitter units are identical within a range of ±30%.

19. The wireless power supply apparatus according to claim 1, wherein
a plurality of the power receiver units is provided, and resonance frequencies of the power receiver resonance circuits included in respective ones of the plurality of the power receiver units are identical within a range of ±30%.

20. The wireless power supply apparatus according to claim 1, wherein
a plurality of the power receiver coils is provided, and electric energy received at respective ones of the plurality of the power receiver coils are collected and supplied to the load.

21. The wireless power supply apparatus according to claim 1, wherein
a plurality of the power transmitter units is provided, and the switching frequency set at each one of the plurality of the power transmitter units is at an industry-science-medical (ISM) band.

22. The wireless power supply apparatus according to claim 1, wherein
the power transmitter unit includes a filter that removes a frequency component at a frequency other than the switching frequency.

23. The wireless power supply apparatus according to claim 1, wherein
the power transmitter unit and the power receiver unit include communication circuits for communicating via radio waves.

24. The wireless power supply apparatus according to claim 23, wherein
the communication circuit is connected to the power transmitter coil, and the power transmitter coil doubles as a coil for communication.

25. The wireless power supply apparatus according to claim 23, wherein
the communication circuit is connected to the power receiver coil, and the power receiver coil doubles as a coil for communication.

26. The wireless power supply apparatus according to claim 3, wherein
the resonator unit includes a communication circuit connected to the resonator coil, and the resonator coil doubles as a coil for communication.

* * * * *